(12) United States Patent
Ueki et al.

(10) Patent No.: US 8,512,428 B2
(45) Date of Patent: Aug. 20, 2013

(54) VENT FILTER AND METHOD FOR MANUFACTURING THE SAME

(75) Inventors: Takuya Ueki, Tokyo (JP); Takayuki Saeki, Tokyo (JP); Shuichi Sayama, Maniwa (JP)

(73) Assignee: Japan Gore-Tex Inc., Tokyo (JP)

( * ) Notice: Subject to any disclaimer, the term of this patent is extended or adjusted under 35 U.S.C. 154(b) by 116 days.

(21) Appl. No.: 12/999,832

(22) PCT Filed: Jun. 19, 2009

(86) PCT No.: PCT/JP2009/061664
§ 371 (c)(1),
(2), (4) Date: Feb. 7, 2011

(87) PCT Pub. No.: WO2009/154307
PCT Pub. Date: Dec. 23, 2009

(65) Prior Publication Data
US 2011/0138762 A1     Jun. 16, 2011

(30) Foreign Application Priority Data
Jun. 20, 2008   (JP) ................................ 2008-162375

(51) Int. Cl.
*B01D 46/00*   (2006.01)
(52) U.S. Cl.
USPC ........... 55/385.4; 55/502; 55/524; 55/DIG. 5; 96/4; 156/106; 156/107; 156/123; 156/124
(58) Field of Classification Search
USPC ............ 55/385.4, 385.6, 524, 495, 503, 523, 55/DIG. 5; 96/4, 6, 10, 14, 45, 46, 55, 135, 96/153, 154, 139; 422/171, 177; 426/113, 426/116, 237; 219/735; 220/203.1, 245, 220/367.1, 745; 454/192; 360/97.02; 362/294, 362/345, 362, 364; 156/106, 107, 123, 124
See application file for complete search history.

(56) References Cited

U.S. PATENT DOCUMENTS

| | | | |
|---|---|---|---|
| 5,096,473 A | 3/1992 | Sassa et al. | |
| 5,417,743 A | 5/1995 | Dauber | |
| 5,869,009 A * | 2/1999 | Bellefeuille et al. | 422/171 |

(Continued)

FOREIGN PATENT DOCUMENTS

| | | |
|---|---|---|
| CN | 1 565 713 | 1/2005 |
| JP | 1-65619 | 4/1989 |

(Continued)

OTHER PUBLICATIONS

International Search Report from PCT/JP2009/061664.
International Search Report from EP 09 76 6755, Apr. 2012.

*Primary Examiner* — Duane Smith
*Assistant Examiner* — Minh-Chau Pham
(74) *Attorney, Agent, or Firm* — Richard W. Ellis

(57) ABSTRACT

An object is to provide a vent filter in which a vent film is less likely to be broken when cut and a measure to shrinkage is taken while the characteristics and functions both inherent to the vent film are being kept. The vent filter includes a frame-shaped adhesive layer 2 and a vent film 3 attached to the adhesive layer 2, wherein an outer peripheral portion of the vent film 3 is positioned at an outer side than an outer peripheral portion of the frame-shaped adhesive layer 2.

20 Claims, 6 Drawing Sheets

(56) References Cited

U.S. PATENT DOCUMENTS

| | | | |
|---|---|---|---|
| 5,891,223 A * | 4/1999 | Shaw et al. | 96/134 |
| 6,214,070 B1 * | 4/2001 | Crowder et al. | 55/320 |
| 6,524,361 B1 * | 2/2003 | Thornton et al. | 55/385.4 |
| 7,255,354 B2 * | 8/2007 | Tamura et al. | 277/650 |
| 7,611,557 B2 * | 11/2009 | Hoffman | 55/385.6 |
| 2003/0047078 A1 * | 3/2003 | Ueki et al. | 96/135 |
| 2003/0056653 A1 | 3/2003 | Ueki et al. | |
| 2005/0091949 A1 * | 5/2005 | Origlia | 55/385.4 |
| 2006/0032372 A1 | 2/2006 | Dauber et al. | |
| 2008/0141635 A1 * | 6/2008 | Clerget | 55/385.4 |
| 2010/0146918 A1 * | 6/2010 | Brosh | 55/385.4 |
| 2012/0060693 A1 * | 3/2012 | Sasaki et al. | 96/139 |

FOREIGN PATENT DOCUMENTS

| | | |
|---|---|---|
| JP | 9 313827 | 12/1997 |
| JP | 10 165787 | 6/1998 |
| JP | 2002-85927 | 3/2002 |
| JP | 2005 169167 | 6/2005 |
| JP | 2006-142199 | 6/2006 |

* cited by examiner

VENT FILTER AND METHOD FOR MANUFACTURING THE SAME

TECHNICAL FIELD

The present invention relates to a vent filter to be used in electronic devices requiring waterproofness and dust-proofness.

BACKGROUND ART

Electronic devices, such as electroacoustic transducers, e.g., loudspeakers and microphones to be used in mobile phones; hard disk drives of personal computers; engine control units of automobiles; and digital cameras, each have at least one opening for allowing a sound to pass therethrough, or at least one opening for adjusting the atmospheric pressure in the inside of each electronic device; thus, each such electronic device foams a semi-enclosed space. The opening is provided with a vent film for the purpose of preventing the entering of water droplets, dust, harmful gases (e.g., $No_x$, $So_x$, oil mist), and others in each electronic device. The vent film requires waterproofness and dust-proofness, and also functions to allow a sound to pass therethrough and to adjust the internal pressure (see Patent Document 1). In this connection, the vent function of the vent film is exhibited or used, not only after the completion of electronic devices or others, but also during the manufacturing process of electronic devices (e.g., when ventilation is carried out so as to allow the escape of a gas expanded in the step of reflow-soldering electronic components).

As a material for forming a vent film as described above, porous polytetrafluoroethylene has widely been used (see, e.g., Patent Document 2).

PRIOR ART DOCUMENTS

Patent Documents

Patent Document 1: Japanese Patent Laid-open Publication (Kokai) No. Hei 8-79865 (paragraph 0018, FIG. 8)
Patent Document 2: Japanese Patent Laid-open Publication (Kokai) No. Hei 10-165787

DISCLOSURE OF THE INVENTION

Problems to be Solved by the Invention

Patent Document 1 does not particularly describe in detail a method of forming or cutting a vent film or a double-sided pressure-sensitive adhesive tape. Conventional vent filters each comprising a vent film and an adhesive layer such as a double-sided pressure-sensitive adhesive tape are usually produced as follows:

FIG. 8 is a series of views showing an ordinary manufacturing process of vent filters. First, as shown in FIG. 8(*a*), an adhesive layer 2 having an opening 2*a* is formed on a release sheet 1 made of polyethylene terephthalate (hereinafter referred to as "PET"), and a vent film 3 made of porous polytetrafluoroethylene is attached onto the adhesive layer 2.

Next, as shown in FIG. 8(*b*), a cut is made at a predetermined position in the adhesive layer 2 and the vent film 3 with a die cutting roll (blade) 4. Then, as shown in FIG. 8(*c*), an unnecessary portion 3*x* of the vent film 3 and an unnecessary portion 2*x* of the adhesive layer 2, both of which are located outside the cut, are peeled off from the release sheet 1.

In this process, however, there arises a problem that as shown in FIG. 8(*d*), the adhesive layer 2 is stretched, and therefore, the outer peripheral portion (end portion) of the vent film 3 is damaged by the peeling off of the unnecessary portion 3*x* and the unnecessary portion 2*x*. This problem is remarkable, particularly when a foam-backed double-sided pressure-sensitive adhesive tape or a backingless-type double-sided pressure-sensitive adhesive tape is used, both of which are unlikely to be completely divided by only being cut once with a sharp blade. In this connection, the "backingless-type double-sided pressure-sensitive adhesive tape" as used herein refers to a double-sided pressure-sensitive adhesive tape that does not have a backing (core) for the purpose of reinforcement or the like.

In view of the above circumstances, it is an object of the present invention to provide a vent filter comprising a frame-shaped adhesive layer and a vent film with a structure in which the vent film is unlikely to be damaged when the vent film is cut.

FIG. 9 shows the case where the adhesive layer 2 has been successfully peeled off. Even in such a case, another problem arises when the vent film 3 is made of a resin such as porous polytetrafluoroethylene. More specifically, a stretched porous polytetrafluoroethylene film is likely to shrink with a passage of time or due to heat, and therefore, as shown in FIG. 9(*d*), the vent film 3 may shrink and the adhesive layer 2 may be exposed. If the adhesive layer 2 is exposed, there arises a problem that foreign matter may become attached to the exposed portion and the exposed portion may be attached to a packaging material for storing the vent filter as a product. This also reduces the workability when the vent filter is mounted to an electronic device after being removed from the packaging material.

Patent Document 2 already points out the problem on the shrinkage of a porous polytetrafluoroethylene film (see paragraph 0006). As a means of solving the problem, Patent Document 2 uses a thermoplastic resin net as a reinforcing material on one or both sides of the porous polytetrafluoroethylene film (see paragraph 0010).

However, the attachment of the thermoplastic resin net is accompanied with an increase in process load. Further, when the vent film 3 is used for an acoustic device, the problem on the deterioration in acoustic characteristics is inevitable. When the vent film 3 is used as a filter for adjusting the internal and external pressures of an electronic device, the problem on the deterioration in air permeability is inevitable.

Thus, it is another object of the present invention to provide, when the vent film is made of an easily shrinkable material, a structure in which the adhesive layer is unlikely to be exposed even if the vent film shrinks, while the characteristics and functions both inherent to the vent film are being kept.

Means of Solving the Problems

The vent filter of the present invention, which can attain the above objects, is a vent filter comprising an adhesive layer formed into a frame shape and a vent film attached onto the adhesive layer, wherein the outer peripheral portion of the vent film is positioned at an outer side than the outer peripheral portion of the frame-shaped adhesive layer.

In a preferred embodiment, the outer peripheral portion of the vent film may be folded back so that a valley is formed on the side of the adhesive layer.

In another embodiment, the vent film may be composed of a fluororesin film.

In a recommended embodiment, the vent film is composed of a porous tetrafluoroethylene film.

In a preferred embodiment, a liquid-repellent agent is added to a surface of the vent film.

In another embodiment, the adhesive layer is a double-sided pressure-sensitive adhesive tape.

The method for manufacturing a vent filter of the present invention, which can attain the above objects, comprises: forming an adhesive layer into a frame shape on a release sheet; covering the adhesive layer with a vent film; and cutting the vent film at an outer side than an outer peripheral portion of the frame-shaped adhesive layer.

The other method for manufacturing a vent filter of the present invention, which can attain the above objects, comprises: forming an adhesive layer into a frame shape on a release sheet; and covering the frame-shaped adhesive layer with a fluororesin-made vent film formed into a larger size than that of the frame-shaped adhesive layer.

Effects of the Invention

The vent filter and the processes for its production according to the present invention make it possible to provide a vent filter comprising an adhesive layer formed into a frame shape and a vent film with a structure in which the vent film is unlikely to be damaged. Further, when the vent film is made of an easily shrinkable material, there is provided a structure in which the adhesive layer is unlikely to be exposed even if the vent film shrinks.

MODE FOR CARRYING OUT THE INVENTION

The vent filter and the method of manufacturing the same according to the mode for carrying out the present invention will hereinafter be described in detail with reference to the drawings.

FIG. 1 is a series of cross-sectional views showing a manufacturing process of a vent filter according to the mode for carrying out the present invention. First, as shown in FIG. 1(a), a release sheet 1 made of PET is prepared, and an adhesive layer 2 is formed on the release sheet 1. The adhesive layer 2 is formed into a frame shape to have an opening 2a.

Figure 1A:
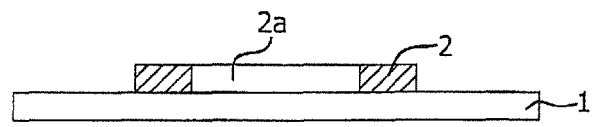
FIGS. 1(a) to 1(f) are cross-sectional views showing a manufacturing process of a vent filter according to the mode for carrying out the present invention.
Figure 1B:
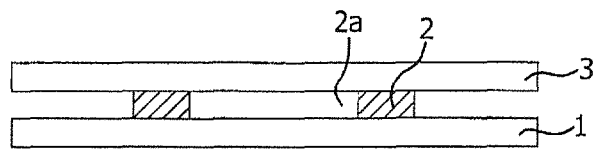

Next, as shown in FIG. 1(b), a vent film 3 made of porous polytetrafluoroethylene (hereinafter referred to as "porous PTFE") is attached onto the adhesive layer 2.

Figure 1C:
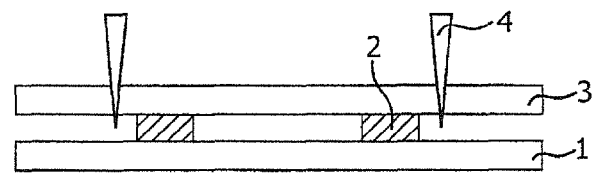

Next, as shown in FIG. 1(c), the vent film 3 is cut at a predetermined position with a die cutting roll (blade) 4, so that the vent film 3 is formed into a circular shape. As a mater of course, the shape of the vent film 3 is not limited to a circular shape because it depends on the shape or other factors of a sound passage opening or a vent opening of an electronic device to which the vent filter is to be attached.

Figure 1D:
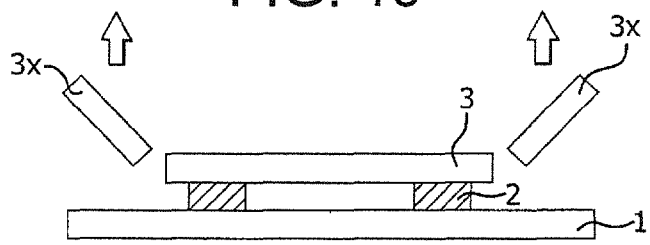

Then, as shown in FIG. 1(d), an unnecessary portion 3x of the vent film 3 located outside the vent film 3 is removed. In this connection, the unnecessary portion 3x is removed not necessarily all at the same time around the entire periphery of the vent film 3, but may be removed at different times depending on the shape of the vent film 3.

In the process shown in FIGS. 1(c) and 1(d), it is important that the outer peripheral portion of the vent film 3 is positioned at an outer side than the outer peripheral portion of the frame-shaped adhesive layer 2. The positional relationship between the outer peripheral portion of the adhesive layer 2 and the outer peripheral portion of the vent film 3 is defined in such a manner, whereby the adhesive layer 2 is not cut with the die cutting roll. Accordingly, an unnecessary portion 2x of the adhesive layer 2, which has conventionally existed, is not generated. This prevents the outer peripheral portion of the vent film 3 from being torn off by the unnecessary portion 2x when the unnecessary portion 3x of the vent film 3 is removed. That is, the outer peripheral portion of the vent film 3 is not damaged. Further, the unnecessary portion 3x of the vent film 3 does not have a portion (i.e., the unnecessary portion 2x) of the adhesive layer 2, and therefore, it can very easily be removed.

To sufficiently attain the effects of the present invention, the distance between the outer peripheral portion of the vent film 3 and the outer peripheral portion of the adhesive layer 2 may preferably be not shorter than 0.1 mm. The distance may more preferably be not shorter than 0.5 mm. On the other hand, the upper limit of the distance may be not longer than 5.0 mm, because if an unfixed part of the outer peripheral portion of the vent film 3 is excessively large, the outer peripheral portion of the vent film 3 may become caught, folded over, or damaged when the vent filter is handled. The upper limit of the distance may more preferably be not longer than 2.0 mm.

Figure 1E:
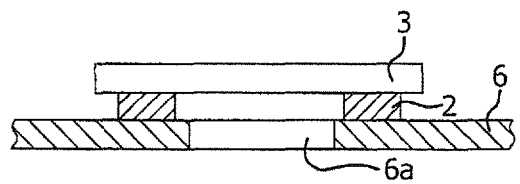

The vent filter formed as described above is stored in the faun of a roll or a strip with the release sheet 1 attached thereto. When the vent filter is used, the release sheet 1 is peeled off therefrom, and as shown in FIG. 1(e), the vent filter is attached to a housing 6 of an electronic device or others so as to cover an opening 6a provided in the housing 6.

Figure 1F:
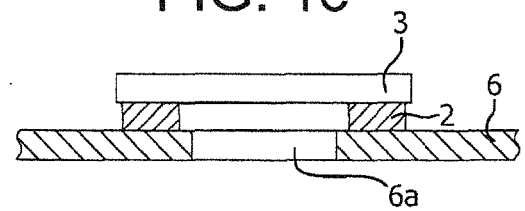

When the vent film 3 is made of an easily shrinkable material, the vent film 3 may have already shrunk, during or after the attachment of the vent filter over the opening 6a, from the state at which the vent film 3 was cut, as shown in FIG. 1(f). As described above, the outer peripheral portion of the vent film 3 is positioned at an outer side than the outer peripheral portion of the adhesive layer 2. Thus, the outer peripheral portion of the vent film 3 has an allowance for some shrinkage, and therefore, such an allowance can prevent the adhesive layer 2 from being exposed.

When the vent film 3 is a stretched porous PTFE film, the shrinkage ratio of the vent film 3 may vary depending on the stretch ratio even if the vent film 3 is produced using the same PTFE material so as to have the same thickness. Accordingly, when the film to be used is a porous PTFE film stretched only in a uniaxial direction or a porous PTFE film stretched in two in-plane directions at different ratios, it may be preferred to provide the above allowance in the direction of the higher shrinkage ratio by, for example, forming the vent film 3 into an elliptical shape for the adhesive layer 2 in a circular shape.

Figure 2A:
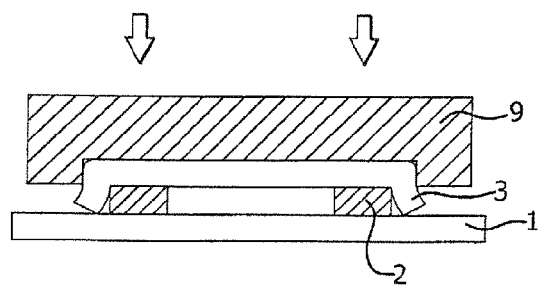
FIGS. 2(a) to 2(b) are cross-sectional views showing another manufacturing process of a vent filter according to the mode for carrying out the present invention.
Figure 2B:
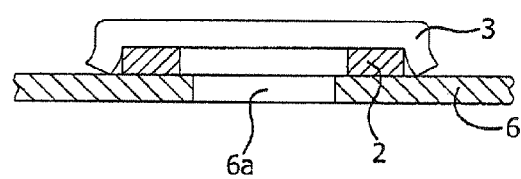

As a measure to the shrinkage of the vent film 3, as shown in FIG. 2(*a*), a jig 9 having a recess for engaging with the outline of the vent film 3 is pressed against the vent film 3 from above, whereby a redundant part of the outer peripheral portion of the vent film 3 can be folded back so that a valley is formed on the side of the adhesive layer 2. This causes the folded part to serve as a hook as shown in FIG. 2(*b*), and therefore, such a hook makes it possible to prevent the adhesive layer 2 from being exposed even if the vent film 3 tends to shrink.

Figure 3:
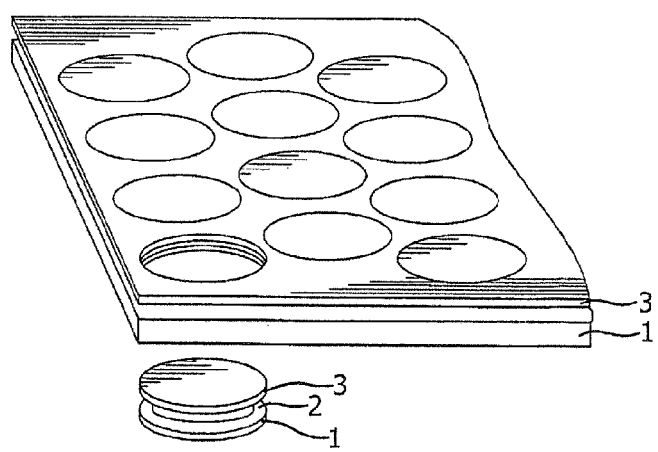
FIG. 3 is a perspective view showing a vent filter according to the mode for carrying out the present invention.

On one release sheet 1, one vent filter or two or more vent filters may be formed. If vent films 3 to be formed are arranged in a honeycomb manner as shown in FIG. 3, it is possible to efficiently obtain vent filters. In this connection, in FIG. 1(*c*), the release sheet 1 is not cut, although the vent film 3 is cut. Alternatively, as shown in FIG. 3, the release sheet 1 may also be punched together with the vent film 3 all at once.

The adhesive layer 2 and the vent film 3, which are basic components of the vent filter according to the mode for carrying out the present invention as described above; and the release sheet 1, which is used in the manufacturing process of the vent filter, will hereinafter be described in more detail.

Examples of the material, other than PET, which can be selected to be used for the release sheet 1, may include, for example, resin films made of polyesters such as polybutyrene terephthalate, polyolefins such as polypropylene, polyethylene, and polymethylpentene, and polycarbonates; paper such as glassine paper, high-quality paper, coated paper, impregnated paper, and synthetic paper; and metal foils made of metals such as aluminum and stainless steel. Further, in order to prevent static charge, the release sheet 1 may be coated with an electrically conductive material, if necessary, or the release sheet 1 itself may be formed using a material mixed with an electrically conductive material. This makes it possible to reduce the electrostatic charge on the product.

The release sheet 1 may desirably have a thickness of, for example, from 10 to 100 μm, preferably from 25 to 50 μm. In order to improve the adhesiveness of the release sheet 1 with a release agent or a pressure-sensitive adhesive, the surface of the release sheet 1 may be subjected to corona discharge treatment, plasma treatment, flame plasma treatment, or other treatments, or may be provided with a primer layer. For the primer layer, there may be used any of polymer materials (i.e., "anchor coating agents") such as polyethylene, polypropylene, styrene-based copolymers, polyesters, polyurethanes, polyvinyl alcohol, polyethylenimine, polyacrylates, polymethacrylates, and modified products thereof.

The adhesive layer 2 is formed into a frame shape to have the opening 2*a*. The shape of the frame is not particularly limited, but may be circular, elliptical, rectangular, or polygonal. Examples of the method of aiming the frame-shaped adhesive layer 2 may include, for example, a screen printing method, a method in which a molten adhesive is transferred to the release sheet 1 with a gravure pattern roll, or a method in which a double-sided pressure-sensitive adhesive tape that has been cut into a frame shape in advance is used as the adhesive layer 2.

As the double-sided pressure-sensitive adhesive tape, various types of adhesive tapes may be used, such as nonwoven-fabric-backed double-sided pressure-sensitive adhesive tapes, of which core is a polyethylene nonwoven fabric, a polypropylene nonwoven fabric, a nylon nonwoven fabric, or other nonwoven fabrics; PET-backed double-sided pressure-sensitive adhesive tapes; polyimide-backed double-sided pressure-sensitive adhesive tapes; nylon-backed double-sided pressure-sensitive adhesive tapes; foam-backed (e.g., urethane foam-backed, silicone foam-backed, acrylic foam-backed, polyethylene foam-backed) double-sided pressure-sensitive adhesive tapes; and backingless double-sided pressure-sensitive adhesive tapes.

Even if a foam-backed double-sided pressure-sensitive adhesive tape or a backingless double-sided pressure-sensitive adhesive tape is cut once with a sharp blade, the cut portions are attached again to each other. Therefore, these tapes are unlikely to be completely divided. Accordingly, since the problem of the breaking of the end portion of the vent film 3 is very remarkable with the structure of the conventional vent filter as described above, in which the vent film 3 and the adhesive layer 2 have the same outer diameter size, the present invention is more effectively applied to the vent filter.

In this connection, an adhesive as used herein refers to an ordinary substance that is used to attach objects to each other, and may include those called "pressure-sensitive adhesives."

As the microscopic shape of the vent film 3, there may be used a net shape, a mesh shape, or a porous shape. As a material for making the vent film 3, there may be used polyethylene, polypropylene, polystyrene, polyimide, or other polymers. It is recommended to use a film preferably made of a fluororesin having high waterproofness, more preferably porous polytetrafluoroethylene (porous PTFE). A porous PTFE film has not only high waterproofness but also small mass due to its porous structure, and therefore, it is suitable for use in both applications in which a sound is allowed to pass therethrough, and applications in which air permeability is provided between the outside and the inside of an electronic device, while water droplets, dust, harmful gases, and others are being prevented from entering into the electronic device.

The porous PTFE film is obtained by mixing PTFE fine powder with a forming aid to give a paste, forming the paste into a formed product, removing the forming aid from the formed product, and then stretching the formed product at a high temperature and a high rate, and further, if necessary, baking the formed product. A uniaxially stretched porous PTFE film has nodes (folded crystals) arranged in a thin-island manner perpendicularly to the stretching direction, and also has fibrils (linear molecule bundles in which folded crystals have been unraveled and pulled out by the stretching) oriented in a reed-screen manner along the stretching direction so as to connect the nodes. This results in a fibrous structure in which holes are formed from spaces defined by the fibrils and spaces defined by both the fibrils and the nodes. A biaxially stretched porous PTFE film has fibrils extending in a radial manner, and also has fibril-connecting nodes interspersed in an island manner. This results in a spider's web-like fibrous structure in which there are many spaces defined by both the fibrils and the nodes.

The vent film 3, which is a constituent material for the vent filter of the present invention, may be a uniaxially stretched porous PTFE film or a biaxially stretched porous PTFE film.

When the vent film 3 is used, the surfaces inside the pores of the vent film 3 may preferably be coated with a liquid-repellent polymer. In this connection, a "liquid-repellent agent" as used in the claims and the specification refers to a substance having the property or the function of repelling liquid, and may include "water-repellent agents", "oil-repellent agents", and "water/oil-repellent agents." An explanation is given below taking a water/oil-repellent polymer as an example.

When the surfaces inside the pores of the vent film 3 have been coated in advance with a water/oil-repellent polymer, it is possible to prevent various contaminants, such as body oils, machine oils, beverages, and laundry detergents, from penetrating into, or being held in, the pores of the vent film. This is because these contaminants reduce the hydrophobicity of porous PTFE that may preferably be used for the vent film, resulting in a cause of deterioration in the waterproofness of the porous PTFE.

As the water/oil-repellent polymer, there may be used polymers each having fluorine-containing side chains. Water/oil-repellent polymers and a method of using them in porous PTFE films to give composites are disclosed in the International Publication No. WO 94/22928. An example thereof is described below.

As the water/oil-repellent polymer, there may preferably be used polymers each having fluorine-containing side chains (the fluorinated alkyl moiety thereof may preferably have from 4 to 16 carbon atoms), which are obtained by polymerizing fluoroalkyl acrylates and/or fluoroalkyl methacrylates, represented by the following general formula (1):

[Chemical Formula 1]

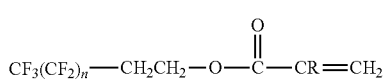

(1)

wherein n is an integer of from 3 to 13 and R is hydrogen or methyl group.

To coat the inside of the pores of the above porous PTFE film with any of these polymer, an aqueous microemulsion of the polymer (an average particle diameter of from 0.01 to 0.5 μm) is prepared using a fluorine-containing surfactant (e.g., ammonium perfluorooctanate), and the pores of the porous PTFE film are impregnated with the aqueous microemulsion, followed by heating. As a result of the heating, the water and the fluorine-containing surfactant are removed, and at the same time, the polymer having fluorine-containing side chains are melted to coat the surfaces inside the pores of the porous PTFE film in such a manner that continuous pores are maintained, thereby making it possible to obtain a vent film having high water repellency and high oil repellency.

Alternatively, as other water/oil-repellent polymers, there may also be used, for example, "AF polymer" (the product name of E.I. du Pont de Nemours and Company) and "Cytop" (the product name of Asahi Glass Co., Ltd.). To coat the surfaces inside the pores of a waterproof and moisture permeable film with each of these polymers, the polymer may be dissolved in an inert solvent, such as "Fluorinert" (the product name of Sumitomo 3M Limited), the porous PTFE film may be impregnated with the resulting solution, and then, the solvent may be removed by evaporation.

In this mode for carrying out the invention, a description is given of the case where the adhesive layer 2 is attached to one surface of the vent film 3; however, when the adhesive layer 2 is attached to a housing of a mobile phone, the other surface of the vent film 3 may be provided with an adhesive layer to which electroacoustic transducers such as microphone and loudspeakers are attached.

EXAMPLES

Example

A vent filter was produced experimentally, in which the following adhesive layer and vent film are stacked in layers.

[Vent Film]

A porous PTFE film having a thickness of 20 μm and a porosity of 90% was prepared by forming a paste resin into a film, the paste resin being obtained by mixing 22 parts by weight of solvent naphtha with 100 parts by weight of polytetrafluoroethylene powder (fine powder) obtained by emulsion polymerization, removing the solvent naphtha by evaporation with heating the film-shaped paste-formed product to a temperature above the boiling point of the solvent naphtha, and then biaxially stretching the resulting product at a rate of 10% or higher per second at a temperature below the melting point of the polytetrafluoroethylene. Then, the porous PTFE film thus prepared was formed into a strip-shaped vent film having a width of 105 mm.

[Structure of Adhesive Layer]

As the adhesive layer 2, there was used a double-sided pressure-sensitive adhesive tape (available from Sumitomo 3M Limited; product number, VHB-Y4914; thickness, 0.25 mm) formed into a ring shape having an inner diameter of 10 mm and an outer diameter of 15 mm, the double-sided pressure-sensitive adhesive tape being obtained by applying an acrylic pressure-sensitive adhesive to both surfaces of an acrylic foam backing material.

Figure 4:
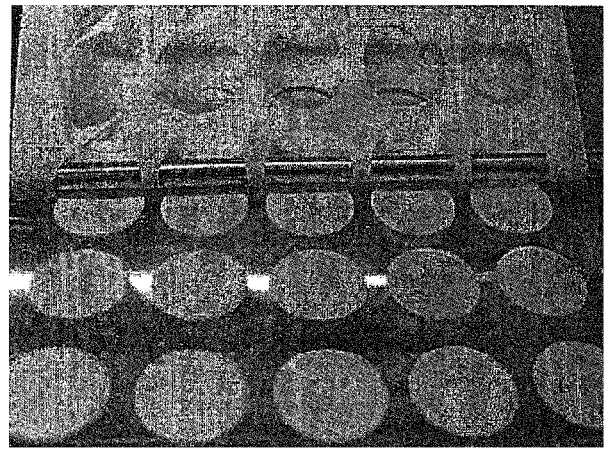
FIG. 4 is a photograph showing a manufacturing process of a vent filter according to the Example of the present invention.

In this Example, after the above strip-shaped vent film was formed on the adhesive layer 2, two or more circular vent films 3 were formed by cutting the above vent film with die cutting rolls. The outer diameter of each vent film 3 was set to be 15.4 mm, so that the outer peripheral portion of each vent film 3 was positioned at an outer side than the outer peripheral portion of each adhesive layer 2 having an outer diameter of 15 mm. With this structure, a test was carried out in which the unnecessary portion of the strip-shaped vent film was peeled off. FIG. 4 shows a photograph of its situation. The vent films 3 were formed at a pitch (i.e., center-to-center distance) of 20 mm. As shown in FIG. 4, the unnecessary portion of the strip-shaped vent film was peeled off without any problem in such a manner that the vent films 3 were neither broken nor deformed.

Comparative Example

In contrast, an additional test was carried out on the manufacturing process of the conventional vent filter as shown in FIG. 8. In this additional test, after a strip-shaped vent film as described above was formed on a double-sided pressure-sensitive adhesive tape, circular vent films 3 were formed by cutting both the vent film and the double-sided pressure-sensitive adhesive tape (see FIG. 8(*b*)). The outer diameter of each vent film 3 was set to be 15 mm. In this connection, as the double-sided pressure-sensitive adhesive tape, there was used the same tape as that used in the above Example (available from Sumitomo 3M Limited; product number, VHB-Y4914; thickness, 0.25 mm). Further, the inner diameter of each opening (see FIG. 8(*a*)) provided in the double-sided pressure-sensitive adhesive tape was 10 mm.

Figure 5:
FIG. 5 is a photograph showing a manufacturing process of a vent filter according to the Comparative Example of the present invention.
Figure 6:
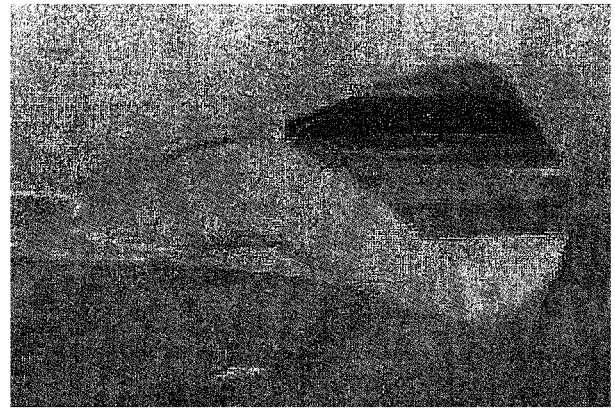
FIG. 6 is a photograph showing a manufacturing process of a vent filter according to the Comparative Example of the present invention.
Figure 7:
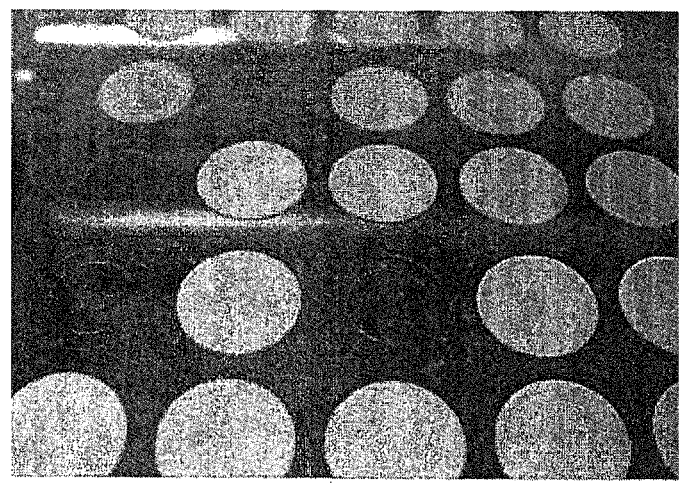
FIG. 7 is a photograph showing a manufacturing process of a vent filter according to the Comparative Example of the present invention.
Figure 8A:
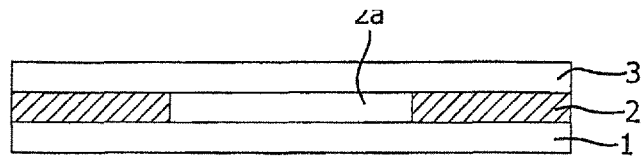
FIGS. 8(a) to 8(d) are cross-sectional views showing a manufacturing process of a conventional vent filter.
Figure 8B:
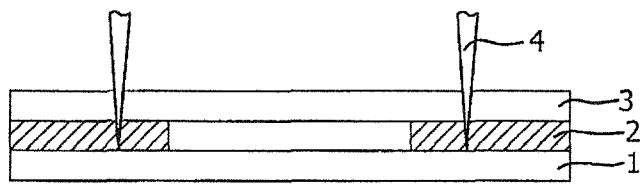
Figure 8C:
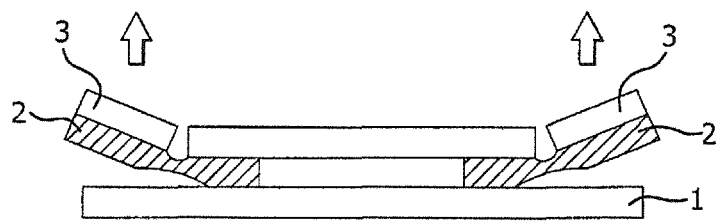
Figure 8D:
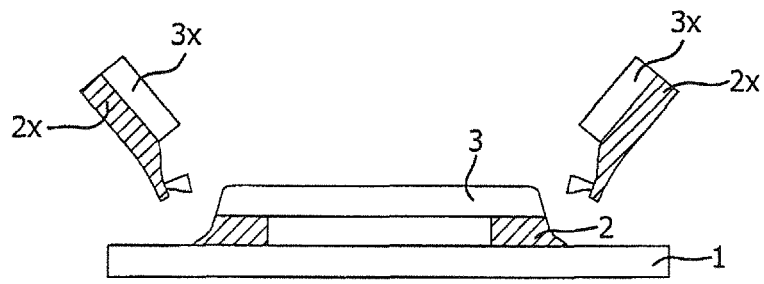
Figure 9A:
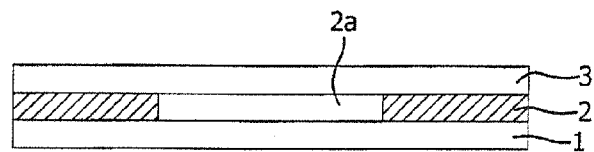
FIGS. 9(a) to 9(d) are cross-sectional views showing another manufacturing process of a conventional vent filter.
Figure 9B:
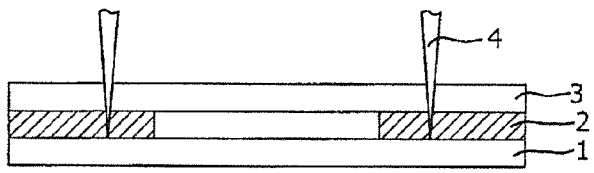
Figure 9C:
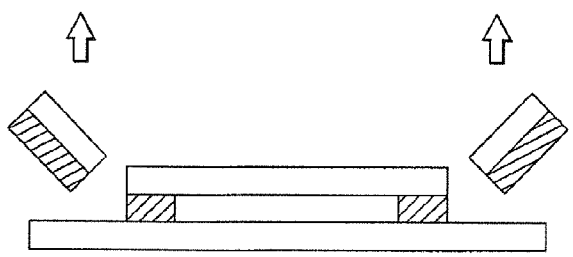
Figure 9D:
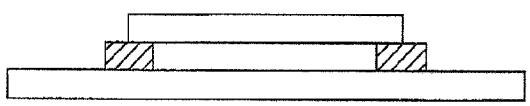

In this Comparative Example, the situation was photographed, in which the unnecessary portion of the strip-shaped vent film was peeled off. The resulting photographs are shown in FIGS. 5 to 7. As shown in FIGS. 5 and 6, the unnecessary portion of the strip-shaped vent film was released while being not separated from some parts of the vent films 3. Then, as shown in FIG. 7, the unnecessary portion was peeled off together with some parts of the vent film 3. Consequently, the yield of the vent filter became less than 80%.

EXPLANATION OF SYMBOLS

1 Release sheet
2 Adhesive layer
2a Opening
2x Unnecessary portion
3 Vent film
3x Unnecessary portion
4 Die cutting roll
6 Housing
6a Opening
8 Frame
9 Jig

What is claimed is:

1. A vent filter comprising an adhesive layer formed into a frame shape with an opening, and a vent film attached to the frame-shaped adhesive layer over the opening, wherein an outer peripheral portion of the vent film is positioned at an outer side than an outer peripheral portion of the frame-shaped adhesive layer.

2. The vent filter according to claim 1, wherein the outer peripheral portion of the vent film is folded back so that a valley is formed on the side of the adhesive layer.

3. The vent filter according to claim 1, wherein the vent film is composed of a fluororesin film.

4. The vent filter according to claim 3, wherein the vent film is composed of a porous polytetrafluoroethylene film.

5. The vent filter according to claim 1, wherein a liquid-repellent agent is added to a surface of the vent film.

6. The vent filter according to claim 1, wherein the adhesive layer is a double-sided pressure-sensitive adhesive tape.

7. A method for manufacturing a vent filter, which comprises: forming an adhesive layer into a frame shape with an opening on a release sheet; covering the frame-shaped adhesive layer and opening with a vent film; and cutting the vent film at an outer side than an outer peripheral portion of the frame-shaped adhesive layer.

8. A method for manufacturing a vent filter, which comprises: forming an adhesive layer into a frame shape with an opening on a release sheet; and covering the frame-shaped adhesive layer and opening with a fluororesin film formed into a larger size than that of the frame-shaped adhesive layer.

9. The vent filter according to claim 1, wherein the outer peripheral portion of the vent film is defined without cutting the outer peripheral portion of the frame-shaped adhesive layer.

10. The vent filter according to claim 1, wherein a distance between the outer peripheral portion of the vent filter and the outer peripheral portion of the frame-shaped adhesive layer is at least 0.1 mm.

11. The vent filter according to claim 1, wherein a distance between the outer peripheral portion of the vent filter and the outer peripheral portion of the frame-shaped adhesive layer is between 0.5 mm and 2.0 mm.

12. The vent filter according to claim 1, wherein the outer peripheral portion of the vent filter reduces potential exposure of the frame-shaped adhesive layer during use and reduces potential damage to the vent film during manufacturing of the vent filter.

13. The vent filter according to claim 4, wherein surfaces inside pores of the vent film are coated with a liquid-repellent agent.

14. The vent filter according to claim 6, further including a removable release sheet attached to the adhesive layer.

15. The vent filter according to claim 14, wherein the removable release sheet is composed of polyethylene terephthalate.

16. The vent filter according to claim 14, wherein the outer peripheral portion of the vent film is defined without cutting the release sheet.

17. The vent filter according to claim 14, wherein the outer peripheral portion of the vent film is defined by cutting together with the release sheet.

18. The vent filter according to claim 14, wherein to use the vent filter the removable release sheet is peeled from the frame-shaped adhesive layer and the frame-shaped adhesive layer is attached to a housing so that the vent film of the vent filter covers an opening provided in the housing.

19. A method for manufacturing a vent filter according to claim 7, wherein the adhesive layer is a double-sided pressure-sensitive adhesive tape, and further comprising:
  cutting the release sheet together with said cutting of the vent filter.

20. A method for manufacturing a vent filter according to claim 7, further comprising:
  folding the outer peripheral portion of the vent film so that a valley is formed on the side of the adhesive layer.

* * * * *

UNITED STATES PATENT AND TRADEMARK OFFICE
CERTIFICATE OF CORRECTION

| | |
|---|---|
| PATENT NO. | : 8,512,428 B2 |
| APPLICATION NO. | : 12/999832 |
| DATED | : August 20, 2013 |
| INVENTOR(S) | : Takuya Ueki et al. |

It is certified that error appears in the above-identified patent and that said Letters Patent is hereby corrected as shown below:

In the Specifications:

At column 4, line 8: change "mater" to --matter--.

At column 4, line 49: change "faun" to --form--.

At column 5, line 57: change "aiming" to --forming--.

Signed and Sealed this
Eighth Day of October, 2013

Teresa Stanek Rea
*Deputy Director of the United States Patent and Trademark Office*